United States Patent [19]  [11] 3,952,361
Wilkins  [45] Apr. 27, 1976

[54] FLOOR TREATING MACHINES
[75] Inventor: John Thomas Wilkins, Bushey Heath, England
[73] Assignee: R. G. Dixon & Company Limited, Wembley, England
[22] Filed: Oct. 4, 1974
[21] Appl. No.: 512,310

[30] Foreign Application Priority Data
Oct. 5, 1973 United Kingdom............... 46685/73

[52] U.S. Cl................................. 15/319; 15/50 R; 15/320; 180/79.1
[51] Int. Cl.² .......................................... A47L 5/00
[58] Field of Search ............... 180/79.1, 98; 15/320, 15/319, 1.7, 50 R

[56] References Cited
UNITED STATES PATENTS
3,010,129  11/1961  Moore .............................. 15/319 X
3,425,197  2/1969  Kita ................................ 180/79.1 X
3,650,097  3/1972  Nokes .............................. 180/79.1 X
3,789,939  2/1974  Geislinger ....................... 180/79.1 X Primary Examiner—Stanley N. Gilreath
Assistant Examiner—C. K. Moore
Attorney, Agent, or Firm—Barlow & Barlow

[57] ABSTRACT

According to the invention there is provided a floor treating machine having laterally spaced drive wheels driven by separate electric traction motors under electronic control so as to be driven by separate train of pulses, comprising means for recording the trains of pulses to the traction motors and means for replaying the record to reproduce the trains of pulses whereby the machine will repeat the operation. When replaying the record it is normally necessary to provide course correction by means of sensing devices for sensing the presence of a wall or other physical obstruction and further sensing devices for sensing the presence of unscrubbed floor, and means for providing overriding control by signals from the sensing devices.

6 Claims, 8 Drawing Figures

FLOOR TREATING MACHINES

This invention relates to floor treating machines, for scrubbing, polishing or otherwise treating large floor areas.

It is not normally convenient to power such machines from the mains so that they carry batteries and the size and weight makes manual propulsion too hard and consequently propulsion motors are also fitted. For convenience, there are provided laterally spaced drive wheels which are driven by separate motors which may be differentially driven for steering.

Our co-pending United Kingdom Patent applications No. 44486/71 (Ser. No. 1,360,261) and 42345/72 describe forms of machine of this type having a manually actuated electronic control whereby each of the two propulsion motors is driven by a train of pulses and the actual control is achieved by varying the duration of the pulses.

Control is achieved by varying the duration of pulses of current fed to the two motors. The pulses of current are controlled in accordance with the setting of potentiometers fitted to a control handle. The ratio of the duration of the "on" period of the pulses to the "off" period is increased to increase motor speed and decreased to decrease it. The machine is steered by the control handle which by means of the controller can vary the speed of one motor relative to the other. The speed of the machine is controlled by varying the speed of both motors in the same way.

According to the present invention, there is provided a floor treating machine having laterally spaced drive wheels driven by separate electric traction motors under electronic control so as to be driven by separate trains of pulses, comprising means for recording the train of pulses to the traction motors and means for replaying the record to reproduce the trains of pulses whereby the machine will repeat the operation.

The recording medium is preferably magnetic tape.

Accordingly, the trains of pulses fed to the motors are recorded on a magnetic tape during a particular scrubbing operation. When it is necessary to scrub the same area again the magnetic tape can be replayed. This time the pulses which were recorded on the tape will be used to directly control the current pulses fed to the motors. Hence the currents fed to the motors would vary in exactly the same way as they varied when the area was scrubbed for the first time. Therefore provided that the machine is started from exactly the same position, it will follow the same path that it followed during the original recording and will not need manual control.

It is appreciated that such a simple system would not operate as described when a large complex area is involved. Due to variations in the motor performance, friction in the transmission system and slippage of the wheels, the machine is likely to deviate gradually from the programmed course. For this reason a course correction system is preferably provided.

The course correction system may include four sensing devices, two on each side. One device on each side is designed to sense the presence of a wall or other physical obstruction at the side of the machine, and the other the presence of unscrubbed floor.

To enable the detectors to provide the requisite control, an extra device is fitted between the tape recorder and the electronic control unit. This is an electronic device which delays both the leading and trailing edges of the pulses produced by the tape recorder. The amount of delay on the trailing edge, however is controlled by the detectors. For example, if the machine approaches too closely to a wall on its right side, the pulses fed to the motor on the right side will be lengthened and the machine will turn away. If it turns away too far the pulses will be shortened and the machine will turn towards the wall. Hence, integrated errors will be corrected. To ensure that the detector comes into operation at the correct time a signal will be put on the tape by the detector when recording which indicates whether or not the wall is present. If this signal is recorded, the wall detector will be given correcting control during play back. There will be many circumstances where correction determined by the presence of a wall cannot be used. The second detector fulfils this purpose. It detects the presence of a previously scrubbed area adjacent to the area being scrubbed and corrects the machine in the same way that the wall detector does but this time it maintains the machine scrubbing to the edge of the previously scrubbed area. It comes into control on play back if the presence of a wall was not detected during the recording and the presence of scrubbed area was detected.

The invention will be further described with reference to the accompanying drawings which show a preferred form of embodiment of the invention, and in which.

Figure 1:
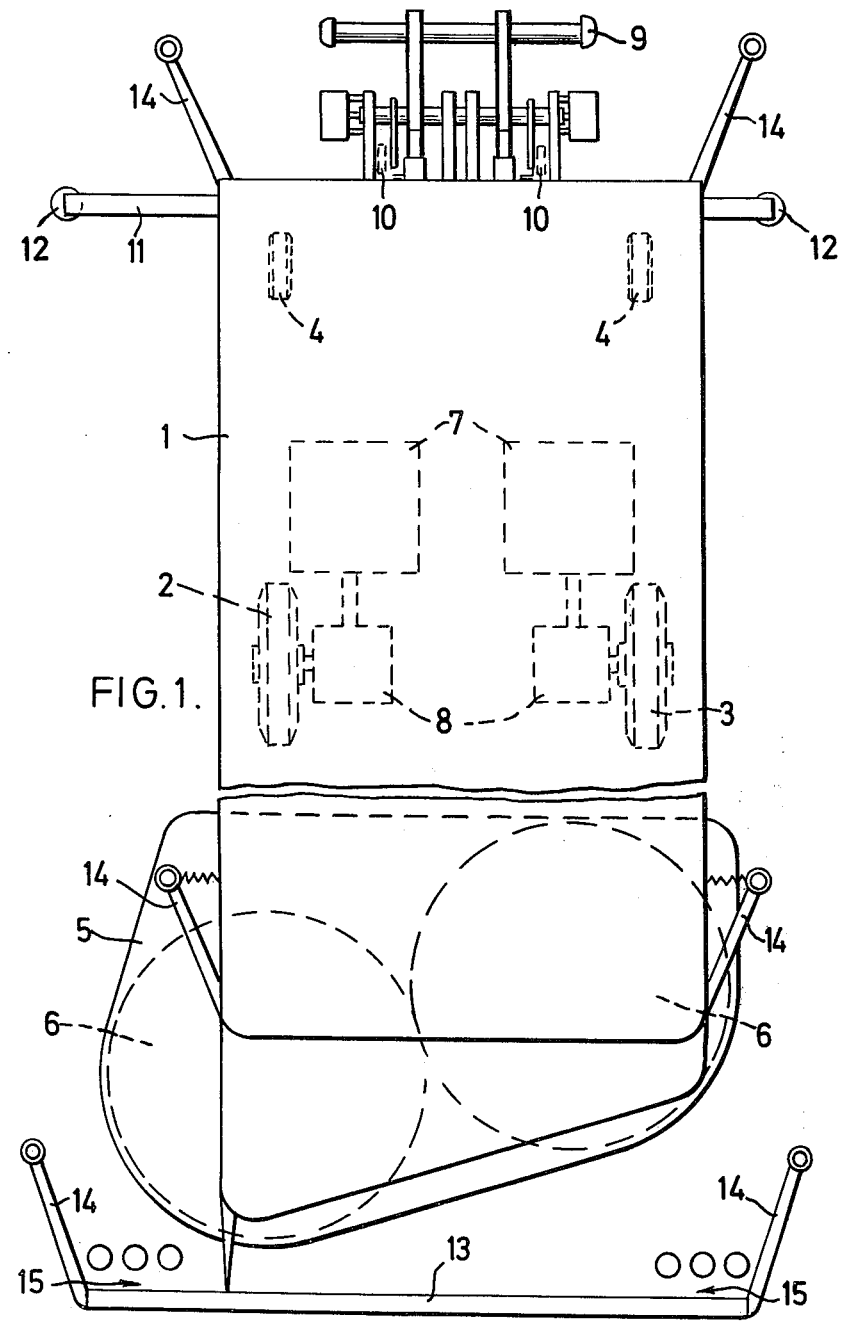
FIG. 1 is a plan view showing a general layout of a form of floor treating machine according to the present invention.
Figure 2:
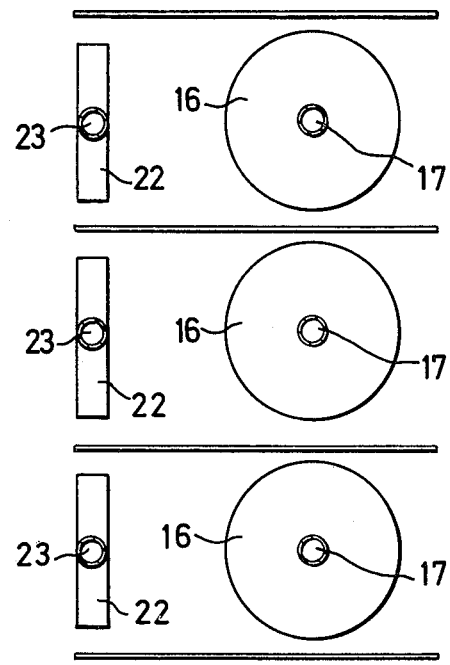
FIG. 2 is an enlarged plan view showing the arrangement of a device for detecting the presence of an already scrubbed floor area.
Figure 3:
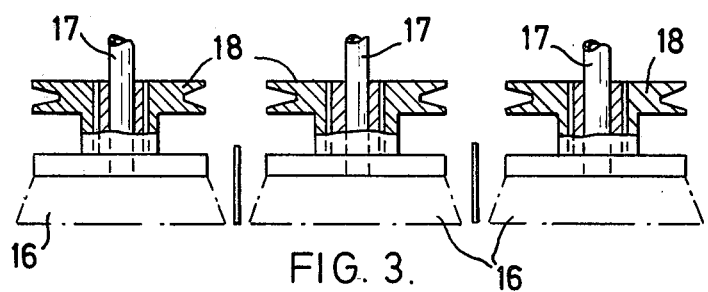
FIG. 3 is a front elevation of part of the device of FIG. 2.

Turning first to FIG. 1, a machine is shown having a body 1 which is mounted on drive wheels 2 and 3 and on a pair of caster wheels 4. The body 1 is arranged to carry storage batteries for powering the machine, and at its forward end it carries a scrubbing head 5 which incorporates a pair of rotary brushes indicated at 6. These brushes rotate about generally vertical axes and are driven from a drive motor independent of the wheels 2 and 3.

Each of the wheels 2 and 3 has an independent drive motor 7 which is connected to the appropriate wheels through a gear box 8. At the rear of the machine there is located a manual control arrrangement comprising a handle 9 which controls the respective drive motors 7 through potentiometers indicated at 10. Moving the handle bodily forward moves both potentiometers in the same way; rotating it moves one potentiometer relative to the other and gives steering. The mechanical arrangements may be similar to those described in our above mentioned co-pending applications.

Also at the rear of the body 1 there is mounted a squeegee nozzle 11 with protective wheels 12. At the front of the machine there is mounted a buffer 13 which is arranged to operate a stop switch should the machine run against an obstruction.

Figure 4:
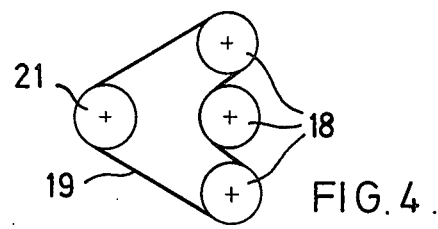
FIG. 4 is a diagram of the drive arrangements for the device of FIGS. 2 and 3.
Figure 5:
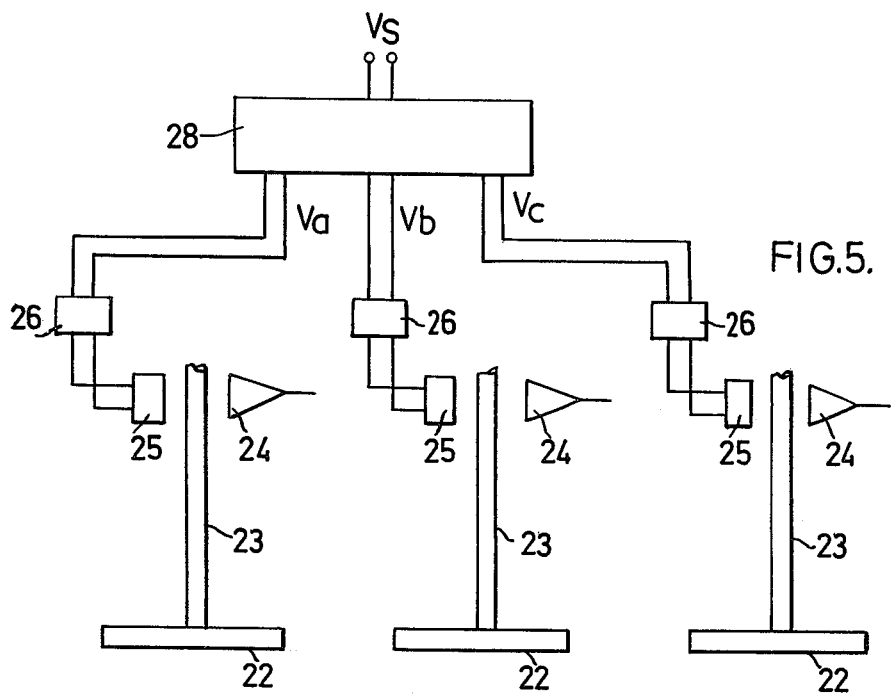
FIG. 5 is an elevation of another part of the device of FIG. 2 incorporating a block diagram of some associated circuitry.

On each side of the machine there is located a set of wall detector arms 14 and at the front of the machine adjacent each side there is provided a detector 15 which detects the boundary between scrubbed and unscrubbed floor. This detector is shown in more detail in FIGS. 2 to 5 as comprising a group of small brushes 16 rotating about vertical axes and provided with clean water feeds 17. The driving is by means of pulleys 18 driven by a common belt 19 from a drive pulley 21 as shown in FIG. 4. Just at the rear of each of the brushes 16 there is provided a squeegee 22 with a transparent return pipe 23. A light source 24 is provided adjacent each of the transparent return pipes 23 and opposite thereto is provided a photo-cell 25 which will give a signal dependent on the transparency of the water passing up through the pipe 23, this acting as a measurement of the dirtiness of the floor beneath the corresponding brush 16. The signals from the photo-cells 25 are fed via amplifiers 26 to an analog computer device 28 which gives an output signal $V_s$ calculated from the input signals $V_a$, $V_b$ and $V_c$ from the amplifiers 26 by a formula of the type:

$$V_s = K_3 \left( \frac{V_a - V_b + K_1}{V_b - V_c + K_1} - K_2 \right).$$

where $K$ is a constant. Where the floor over the whole area swept by the three brushes 16 is of constant cleanliness, this reduces to $K_3 (1 - K_2)$ which is the same as the signal produced when correctly scrubbing to a previously scrubbed edge. The voltage output varies above or below this value. As the brushes move relative to the scrubbed edge, but the voltage is not affected greatly by the degree of dirtiness of the floor. Refinements to the formula are possible to increase the sensitivity to position and decrease the sensitivity to dirtiness.

Figure 6:
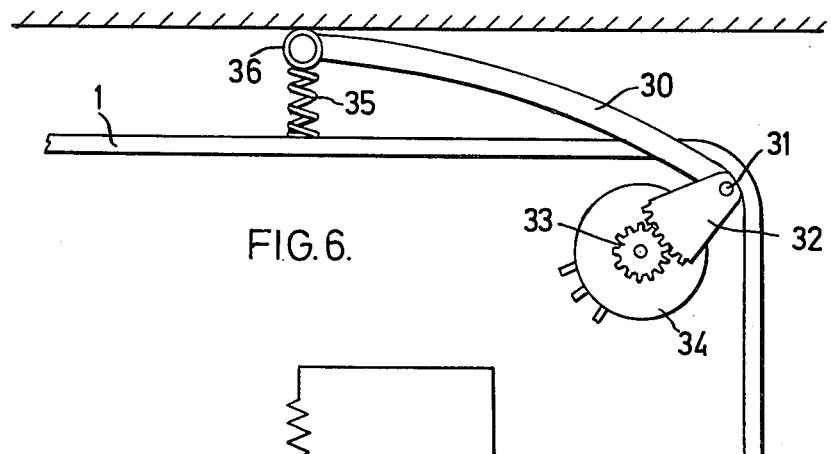
FIG. 6 is a plan view of a wall detector.
Figure 7:
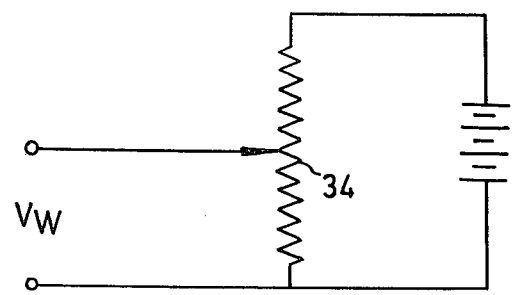
FIG. 7 is a diagram showing the circuitry assembled with the detector of FIG. 6.

Turning now to FIGS. 6 and 7, a typical wall detector arrangement is shown as comprising an arm 30 pivoted about a fixed pin 31 and carrying a sector gear 32 cooperating with a pinion 33 on a rotary potentiometer 34. The arm 30 is spring-loaded outwardly by a spring 35 to a rest position as illustrated in FIG. 1, and it carries a wheel 36 to minimise damage and marks on the wall. When the machine approaches a wall, the spring 35 is depressed as the arm 30 pivots, and the potentiometer is rotated so as to give a signal $V_w$ as indicated in the simple circuit of FIG. 7.

Figure 8:
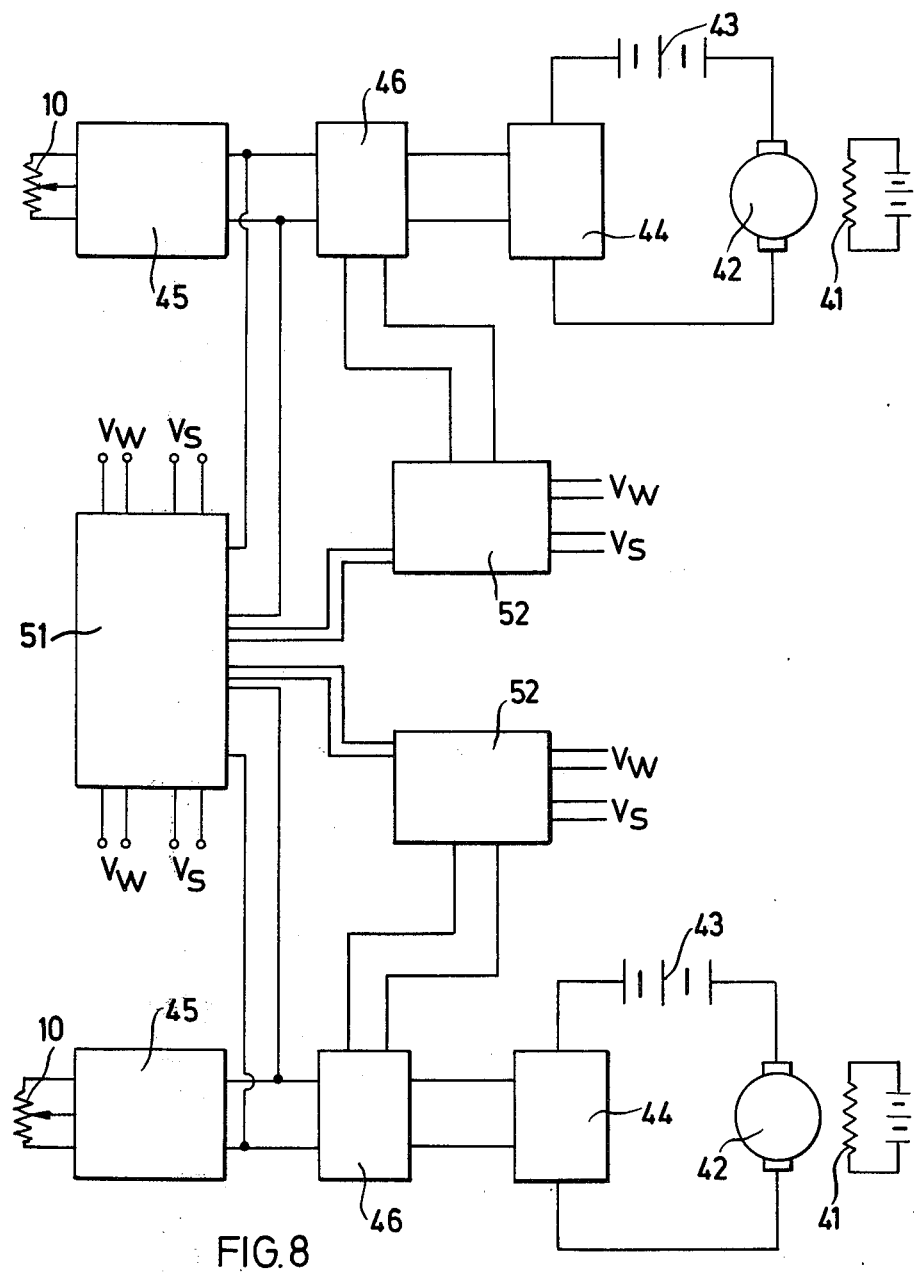
FIG. 8 is a block diagram showing the circuitry for controlling the drive motors.

FIG. 8 shows a diagram of the control circuits for the two motors 8, each of which is shown as having a field circuit 41 and armature 42 which is energised from the battery 43 through an electronic switch 44 which would normally consist of a power transistor or a series of power transistors in parallel. The control for manual operation of the machine through the handles 9 is derived from the potentiometers 10 the signals from which are fed to individual pulse generators 45 which produce rectangular voltage pulses at constant frequency and of a duration proportionate to the setting of the potentiometers 10. These pulses are fed through delay units 46 to the electronic switches 44 which thus produce a series of pulses corresponding to those produced by the pulse generators 45 as modified by the delay units 46.

In order to enable the machine to be operated automatically, once it has been operated manually, a multi-track tape recorder 51 records the outputs from the two pulse generators 45, and it can be seen that if these pulses are replayed from the recorder 51 and fed through the delay units 46 to the switches 44, the motors should repeat their operations and drive the scrubbing machine on the same path as it followed in the manual control mode. However, because of slight operating differences that may occur, it is normally necessary to provide modification to the automatically produced path, and this is the reason for the provision of the wall detectors 14 and the scrubbed/unscrubbed floor area detectors 15. As described, these provide signals VW and VS which are fed to logic units 52. The recorder 51 also records on further tracks a signal to indicate whether there were positive signals VW or VS applied from either side.

The delay unit 46 is such that the output pulses from it have a leading edge delayed by a fixed amount relative to the leading edge of the input pulses fed from the generator 45 or the recorder 51. The trailing edge of the output pulses from the delay unit 46 is delayed relative to the trailing edge of the input pulses by a variable amount which is proportional to the control voltage applied from the logic unit 52.

When in the manual operation and recording mode of operation the logic unit 52 provides a constant output voltage which is of such value that the output pulses from the delay unit 46 are of the same duration as the input pulses.

In the play-back mode of operation, when there are no signals indicating the presence of inputs VW or VS to the recorder at the appropriate time, the logic units are switched so as to produce this constant output voltage so that the delay units 46 produce the same output and the motor drive pulses are the same as those used during the recording time. If during the corresponding recording mode, the wall detector was producing a signal, then the record of this presence actuates the corresponding logic unit 52 to connect the VW output to the input to the corresponding delay unit, so that the operation of the machine will be modified to maintain it at a constant distance from the wall. Similarly, if the wall detector was not operating during recording, but the scrubbed edge detector was producing a signal, then the signal from the appropriate scrubbed edge detector would be fed by the logic unit to the delay unit to modify the output to the electronic switch 44, so as to make the machine follow the scrubbed edge. To prevent instability it may also be necessary to incorporate electronic feed back of a voltage proportional to the rate of change of the sensing voltages as is well known in servo mechanism design.

Various modifications may be made within the scope of the invention.

I claim:

1. In a floor treating machine comprising laterally spaced drive wheels, separate traction motors drivably connected to the wheels and electronic control means to provide separate trains of pulses to operate the motors conjointly for straight line motion and differentially for steering motion: the improvement of means for recording the trains of pulses to the traction motors for recording the path followed by said machine and means for replaying the record to reproduce the trains of pulses whereby the machine will reproduce the original path followed by the machine, and a course correction system coupled between the control means and the motors comprising first sensing devices for sensing the presence of a wall or other physical obstruction in the immediate path of the machine and further sensing devices for sensing the condition of the floor in a predetermined location with respect to the machine, said sensing devices producing overriding signal control to the motors to thereby effect course correction in response to said signals from the sensing devices.

2. A floor treating machine as claimed in claim 1, in which the overriding control means includes a delay device for delaying the leading and trailing edges of the train of pulses, the said sensing devices coupled to the delay device to vary the duration of said pulses.

3. A floor treating machine as claimed in claim 1, in which the recording means receives and records the presence of signals from the sensing devices, and means is provided to couple the overriding control means to the motor control during play back by the recording means.

4. A floor treating machine as claimed in claim 1, in which a sensing device for sensing a wall or other physical obstruction comprises a series of pivoted fingers, spring means loading the finger outwardly of the machine, and variable electrical components operable by the pivoting of the fingers.

5. A floor treating machine as claimed in claim 1, including a plurality of rotary floor-engaging brushes, means associated with each brush for feeding fresh cleaning solution into the region thereof, and further sensing devices consisting of transparent take-up pipes associated with the individual brushes for collecting the cleaning solution after brushing on the floor, light sources mounted adjacent each pipe and photo-electric cells mounted opposite thereto, said photo-cells measuring the clarity of the solution taken up and producing a signal that is coupled to the overriding signal control.

6. A floor treating machine as claimed in claim 5, comprising means responsive to the outputs of said photo-cells for detecting a difference in the clarity of the solution taken up by the different take-up pipes.

* * * * *